United States Patent [19]
Eck

[11] Patent Number: 5,791,317
[45] Date of Patent: Aug. 11, 1998

[54] FLOW VALVE

[75] Inventor: Karl Eck, Frankfurt, Germany

[73] Assignee: VDO Adolf Schindling AG, Frankfurt, Germany

[21] Appl. No.: 892,691

[22] Filed: Jul. 14, 1997

[30] Foreign Application Priority Data

Jul. 16, 1996 [DE] Germany .................. 196 28 580.1

[51] Int. Cl.[6] ............................................. F02M 37/04
[52] U.S. Cl. ..................................... 123/510; 123/514
[58] Field of Search .................... 123/509, 506, 123/510, 511, 514; 137/115.05, 115.08, 115.26

[56] References Cited

U.S. PATENT DOCUMENTS

| 5,289,810 | 3/1994 | Bauer et al. | 123/514 |
| 5,560,343 | 10/1996 | Werkmann et al. | 123/514 |
| 5,655,504 | 8/1997 | Iwai | 123/514 |
| 5,692,479 | 12/1997 | Ford et al. | 123/514 |

Primary Examiner—Thomas N. Moulis
Attorney, Agent, or Firm—Martin A. Farber

[57] ABSTRACT

A flow valve for a fuel supply system is arranged in a supply line leading to an internal combustion engine and, in a basic position upon the start of the internal combustion engine, closes a branch line which leads to a sucking-jet pump. For this purpose the flow valve has a closure member which is displaceable substantially transverse to the direction of flow by the flow of the fuel.

15 Claims, 3 Drawing Sheets

FLOW VALVE

FIELD AND BACKGROUND OF THE INVENTION

The present invention relates to a flow valve for a fuel supply system in which a fuel feed device is arranged in a fuel tank and is provided for feeding fuel via a fuel line to an internal combustion engine, the flow valve having a main channel forming a part of the fuel line and having a connection, branched off from the main channel, for a branch line leading to a sucking-jet pump. The flow valve includes also a closure member for controlling the branch line, the closure member being arranged in the main channel. In its basic position the valve closes a valve seat of the connection. Included within such a valve is a passage developed as throttle point for the fuel flowing to the internal combustion engine, the passage being arranged between the closure member and a wall of the main channel.

Such flow valves are generally used in modern motor vehicles for controlling a sucking-jet pump which fills a surge pot, and they are thus known. The purpose of the flow valve is to shut off the branch line to the sucking-jet pump upon the starting of the internal combustion engine, since the fuel feed device frequently feeds only a small amount of fuel upon the starting of the internal combustion engine. In particular, an electrically supplied fuel feed device conveys particularly little fuel upon start-up, since a starter battery which supplies the fuel feed device has particularly little power at low temperatures. The flow valve is to prevent a part of the fuel conveyed, which is in any event small, be branched-off upon a start of the internal combustion engine for the sucking-jet pump. Shortly after the starting of the internal combustion engine, a generator of the internal combustion engine, as a rule, produces sufficient power so that the flow valve opens and the sucking-jet pump is also provided with fuel.

In the known flow valve, the closure member is urged by a spring against a valve seat and is developed for opening in the direction of flow. In the closure member, or between the closure member and the wall of the main channel, there are one or more passages for the fuel which are developed as throttle points. The small amount of fuel which is fed by the fuel feed device upon the starting of the internal combustion engine passes through the passages to the internal combustion engine. After the start, a larger amount of fuel is fed, so that a pressure difference is built up in front of and behind the closure member and presses the closure member away from the valve seat. The fuel fed by the fuel feed device then arrives at the internal combustion engine and, via the branch line, at the sucking-jet pump.

The known flow valve has the disadvantage that the closure member is developed to open in the direction of flow of the fuel. As a result, that the flow valve is expensive to produce and requires very large dimensions. The dimensions are determined by the pressure difference to be produced in front of and behind the closure member by the fuel feed device, above which pressure difference the flow valve is to open. Passages to be arranged in the closure member lead to a further increase in the dimensions of the closure member. Furthermore, the main channel must have a radial widening for bypassing with fuel in the region in which the closure member is located in the open position of the flow valve. Since the closure member opposes a large amount of resistance to the flow, this radial winding must furthermore be particularly large.

SUMMARY OF THE INVENTION

It is an object of the invention so to develop a flow valve of the aforementioned type that it can be produced as simply as possible and has particularly small dimensions.

According to the invention, the closure member (15) and/or the main channel (10) has means (slot 19, flow guide vane (28)) for moving the closure member (15) transverse to the direction of flow.

By this development, the closure member is moved transversely to the direction of flow upon a starting of the internal combustion engine and thus is displaced substantially from the flow of fluid in the main channel. For a reliable control of the branch line, the closure member does not need any passages so that it is of particularly small dimensions and is very easy to produce. Due to the flow, the closure member moves further and further out of the flow with increased strength of the flow. In this way, the fluid can flow through the main channel substantially along a straight line of flow so that the closure member exerts only an insignificant throttling action on the flow in the main channel in the open position of the flow valve. By a slight throttling of the flow in the main channel in an open position, the flow valve can have particularly small dimensions.

In accordance with one advantageous embodiment of the invention, the flow valve is of particularly simple construction if the valve seat (18) is arranged in a wall of the main channel (10) which wall is directed parallel to the direction of flow of the fuel. This simple construction, for instance, simplifies the production of the flow valve by injection molding.

The movement of the closure member can be produced particularly easily in accordance with another advantageous development of the invention if the means for moving the closure member (15) is a slot (19) arranged between the wall of the main channel (10) and the side of the closure member (15) facing away from the valve seat (18). Upon a flow of fuel through the slot, a dynamic vacuum is produced in the slot which first of all lifts the closure member off from the valve seat. The closure member is then pressed out of the flow by the fluid, particularly fuel for an internal combustion engine.

In accordance with another advantageous development of the invention, a force which acts transverse to the direction of flow and becomes stronger with an increase in the velocity of flow acts on the closure member when the closure member (15) has, as means for its movement, at least one flow guide vane (28) which extends into a lateral region of the main channel (10) and, as seen in the direction of flow, extends towards the valve seat (18).

In accordance with still another advantageous feature of the invention, the closure member is particularly easy to manufacture if the closure member (15) is developed in the form of a sphere or roller. Furthermore, the closure member, as a result of this development, has a form which is particularly favorable from a flow standpoint so that it presents particularly little resistance to flow in the main channel.

In accordance with another advantageous feature of the invention, the closure member is moved reliably into or out of the position blocking the connector piece for the branch line if at least one guide element (bevel 17, 25, rib 26) for the closure member (15) is arranged in the main channel (10).

In accordance with another advantageous development of the invention, the guide member is of particularly simple construction if the valve seat (18) has a bevel (17, 25) as guide member element.

Canting and thus jamming of the closure member is reliably prevented in accordance with another advantageous development of the invention if ribs (26) extending substantially transverse to the direction of flow are arranged as guide elements in the main channel (10).

In the open position of the flow valve, it is advantageous for the fuel to flow through the main channel as free of eddying as possible. Eddies which are caused for instance by a flowing around the closure member in the case of the known flow valve can, particularly at higher temperatures, favor a gassing of the fuel. Furthermore, these eddies produce within the region of the closure member a drop in pressure which must be compensated for by particularly large dimensions of the main channel. The flow of the fuel takes place particularly free of eddies in the main channel if the flow valve has a recess (20, 22, 32) to receive the closure member (15) in a position arranged substantially outside the main channel (10). By this development, the closure member is pressed by the flow of the fuel out of the basic position away from the valve seat and at the same time removed from the flow of the fuel in the main channel.

The closure member could, for instance, be urged into the basic position by a spring. However, that development has the disadvantage that the spring force exerted on the closure member increases with increasing distance of the closure member from the valve seat. Since the force opposing the spring must be applied by the flow of the fuel, the flow is continuously strongly throttled in the main channel. The closure member is reliably held on the valve seat in the basic position and requires particularly little force for holding it in the position removed from the valve seat when the closure member (15) and the valve seat (18) or a region adjoining the valve seat (18) have in each case magnetic elements (30, 31) in order to hold the closure member (15) on the valve seat (18). This provision of the magnetic elements has the advantage that the force exerted on the closure member decreases with increasing distance of the closure member from the valve seat, as a result of which particularly little force is necessary in order to hold the setting member in the position spaced from the valve seat.

Separately arranged parts for holding the closure member in the basic position such as, for instance, the spring or magnetic elements, are not required, in accordance with another advantageous development of the invention, if the closure member (15) has a lower specific gravity than the fuel and if the valve seat (18) is arranged above the closure member (15). In the basic position, the closure member is thus pressed like a float against the valve seat. By the saving of a part, a further simplification of the flow valve is obtained so that its cost of manufacture is further reduced.

In the basic position in accordance with another advantageous further development of the invention, the closure member lies reliably on the valve seat if the closure member (15) has a higher specific gravity than the fuel and if the valve seat (18) is arranged below the closure member (15).

The invention permits of numerous embodiments.

BRIEF DESCRIPTION OF THE DRAWINGS

With the above and other objects and advantages in view, the present invention will become more clearly understood in connection with the detailed description of preferred embodiments, when considered with the accompanying drawings, of which.

BRIEF DESCRIPTION OF THE PREFERRED EMBODIMENTS

Figure 1:
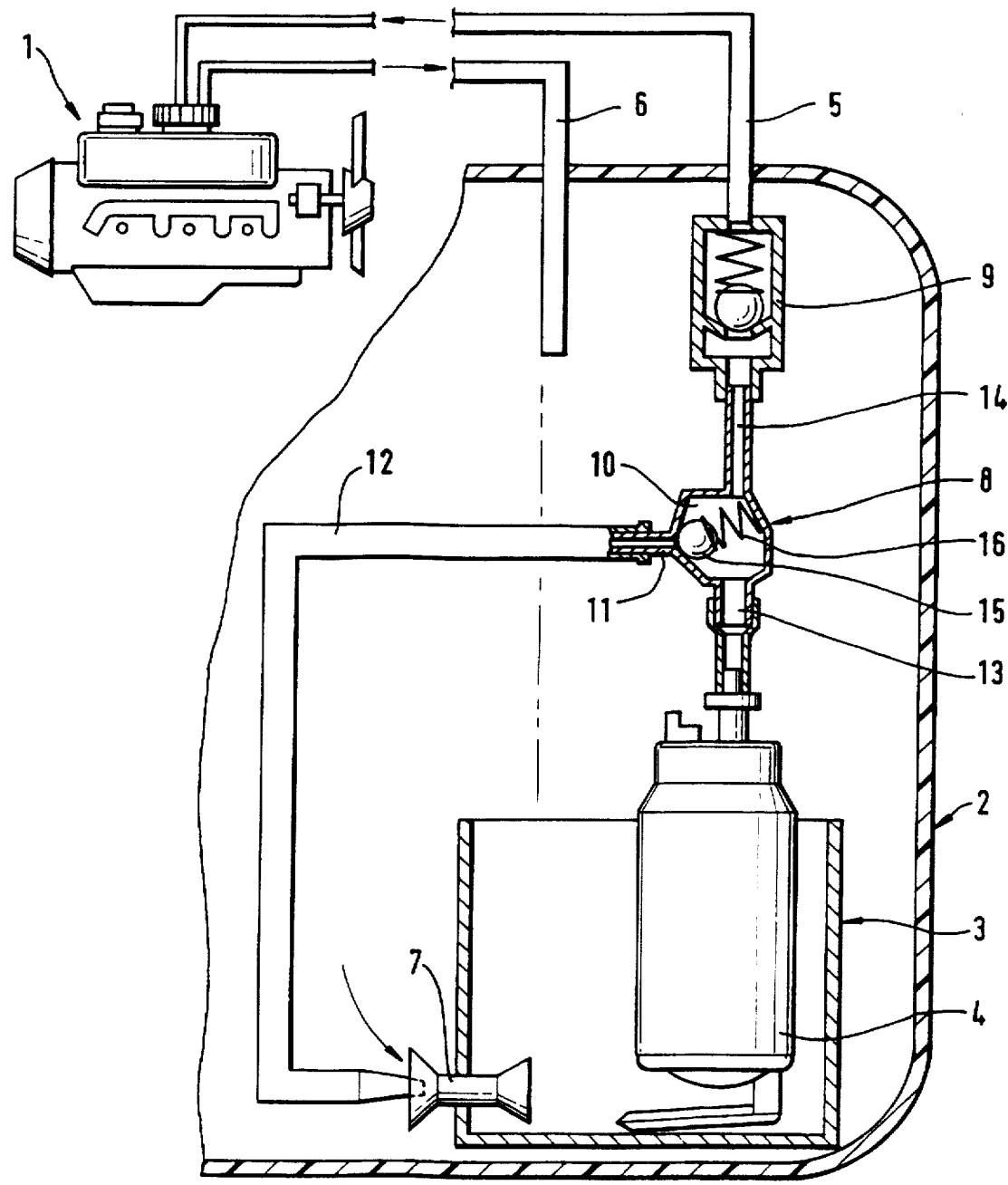
FIG. 1 is a fuel supply system having a flow valve in accordance with the invention.

FIG. 1 shows a fuel supply system for supplying an internal combustion engine 1 with fuel from a fuel tank 2. The fuel tank 2 has a surge pot 3 within which a fuel feed device 4 is arranged. From the fuel feed device 4 a supply line 5 extends to the internal combustion engine 1. A return line 6 provided for the return of excess fuel which has been fed extends from the internal combustion engine to the surge pot 3. The surge pot 3 is filled with fuel from the fuel tank 2 via a sucking-jet pump 7 located in a lower region of the tank 2. In the supply line 4 there are arranged a flow valve 8 and a non-return valve 9. The flow valve 8 has a main channel 10 which forms a part of the supply line 5 and a connecting piece 11 to which a branch line 12 leading to the sucking-jet pump 7 is connected. The flow valve 8 serves to prevent fuel flowing over to the sucking-jet pump 7 upon the starting of the internal combustion engine 1.

Figure 2:
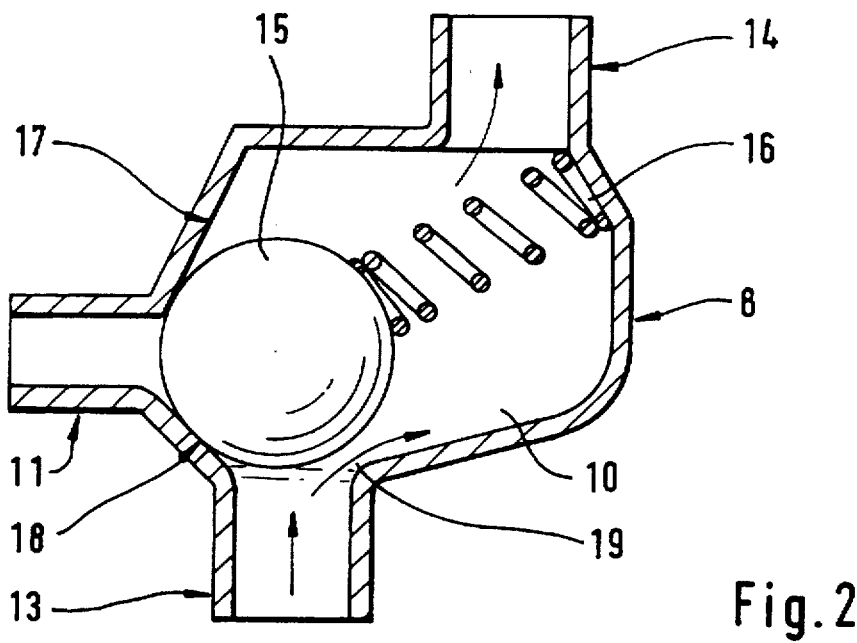
FIG. 2 shows the flow valve of FIG. 1 in a basic position.
Figure 3:
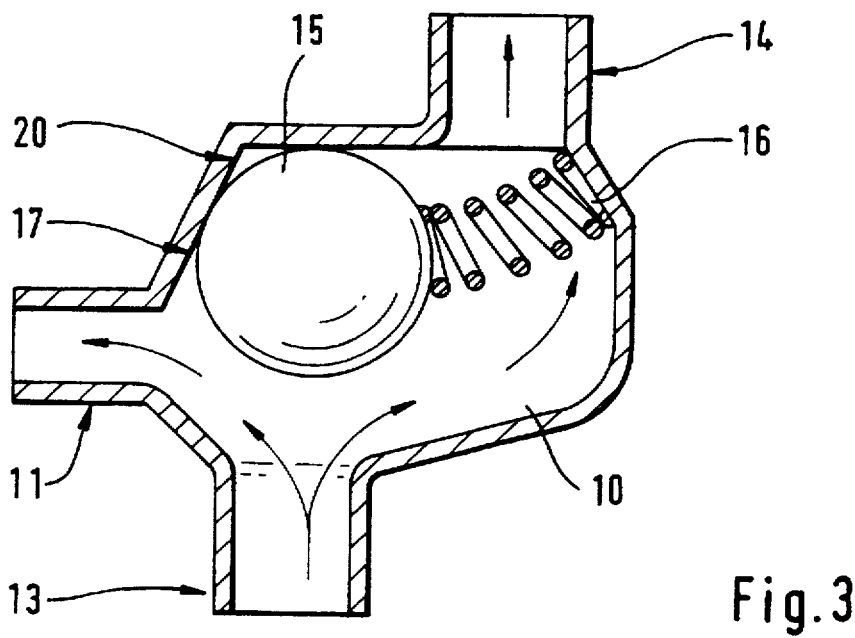
FIG. 3 shows the flow valve of FIG. 1 in an open position.

The construction and operation of the flow valve 8 of FIG. 1 can be noted particularly clearly from FIGS. 2 and 3. In order to explain the function of the flow valve 8, the flow of the fuel is indicated by arrows. The main channel 10 leads from an inlet 13 to an outlet 14 of the flow valve 8. The connecting piece 11 debouches on the side onto the main channel 10 and can be blocked by a spherical closure member 15. The closure member 15 is urged by a spring 16 into a basic position shown in FIG. 2 and is displaceable by the flow in the main channel along a bevel 17 into an open position shown in FIG. 3.

In the basic position of the flow valve 8 of FIG. 1 which is shown in FIG. 2, the closure member 15 is urged by the spring 16 against a valve seat 18 of the connecting piece 11. In this position, the main channel 10 has a slot 19 as throttle point between a wall and the closure member 15. This slot 19 is arranged on the side of the closure member 15 facing away from the valve seat 18. Upon a flow of fuel in the main channel 10, there is produced in the slot 19 a dynamic vacuum which exerts a force directed away from the valve seat 18 on the closure member 15. Above a predetermined velocity of flow, this force is so great that the closure member 15 is lifted vertically from the valve seat 18 and thus transverse to the direction of flow. Thereupon, the closure member 15 is pressed into the open position by the flow along the bevel 17.

The closure member is present, in the open position shown in FIG. 3, in a recess 20 which does not prevent the flow in the main channel 10. In this way, only insignificant eddyings of the fuel are produced in the main channel 10 by the closure member 15. Upon s disconnecting of the fuel feed device 4 shown in FIG. 1, the closure member 15 is moved back again by the spring 16 into the basic position shown in FIG. 2.

Figure 4:
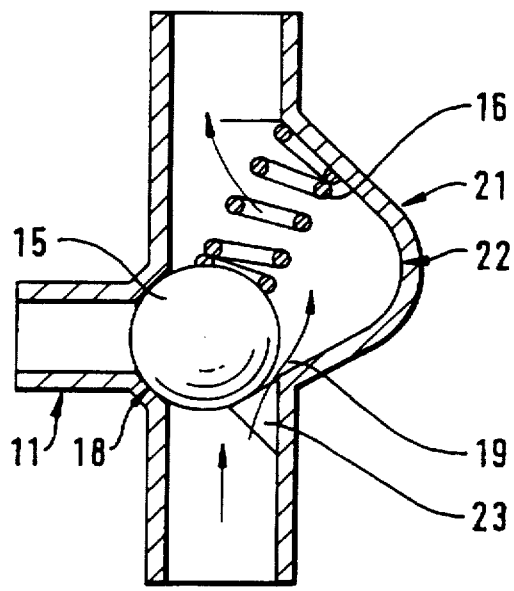
FIGS. 4 to 6 are further embodiments of the flow valve of the invention.

In an embodiment of a flow valve 21 shown in FIG. 4, a recess 22 for the closure member 15 is provided in the wall of the main channel 10 opposite the valve seat 18. The spring 16 is arranged obliquely in the main channel 10 and presses the closure member 15, in the basic position of the flow valve 21 shown, onto the valve seat 18. As in the embodiment of the flow valve shown in FIGS. 2 and 3, the slot 19 is present on the side of the closure member 15 facing away from the valve seat 18. A nose 23 directed in the main channel 10 lengthwise in direction of flow prevents a closing of the inlet 13 of the flow valve 21.

Figure 5:
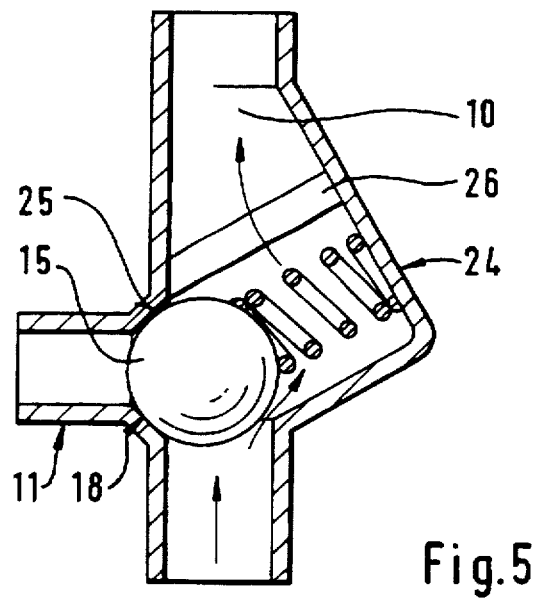

FIG. 5 shows a flow valve 24 in a basic position in which the valve seat 18 in the connecting piece 11 has a funnel-shaped bevel 25 to receive the closure member 15. The bevel 25 is extended by a rib 26 up to the opposite wall of the main channel 10. This bevel 25 and the rib 26 serve for the guiding of the closure member 15 substantially transverse to the direction of flow in the main channel 10.

Figure 6:
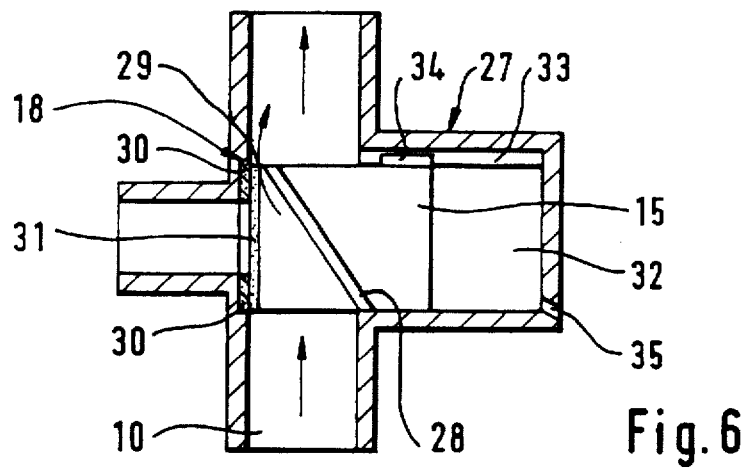

In an embodiment of a flow valve 27 which is shown in FIG. 6, the closure member 15 has a flow guide vane 28 in a lateral region. This flow guide vane 28 is developed extending towards the valve seat 18 as seen in the direction of flow of the main channel 10. In the basic position of the flow valve 27 shown, the main channel 10 has a passage 29 for the fuel near the valve seat 18. The valve seat 18 and the closure member 15 have in each case magnetic elements 30, 31 by which the closure member 15 is held in the basic position. A flow of the fuel through the passage 29 produces a force directed away from the valve seat 18 on the closure member 15. Above a predetermined velocity of flow, the force exerted by the flow on the closure member 15 exceeds the magnetic holding forces. The closure member 15 is then moved transverse to the direction of flow into a recess 32 present outside the flow. For guidance, recess 32 has a guide groove 33 and the closure member 15 has a nose 34 which engages into the guide groove 33. The recess 32 has a vent hole 35 for venting. After a disconnecting of the fuel feed device 4 shown in FIG. 1, the closure member 15 is moved back into the basic position on the valve seat 18 by the magnetic forces of the magnetic elements 30, 31. In order to assist in this movement, the closure member 15 can have, in addition, a greater density than the fuel and the valve seat 18 can be arranged below the closure member 15. This may be seen in the drawing by rotating the device of FIG. 6 by 90°.

I claim:

1. A flow valve for a fuel supply system having a fuel tank and a sucking-jet pump, wherein a fuel device is located in the fuel tank for feeding fuel via a fuel line to an internal combustion engine, the valve comprising:

a main channel forming part of the fuel line, a closure member, a branch line, a connection on the main channel for receiving the branch line, and a valve seat disposed in the connection;

wherein the main channel is a part of the connection, the branch line leads to the sucking-jet pump, and the closure member is disposed in the connection for controlling fluid flow in the branch line, the closure member is arranged in the main channel and has a basic position for closing the valve seat of the connection;

a passage is developed within the connection to provide a throttle point for fuel flowing to the internal combustion engine, the passage being arranged between the closure member and a wall of the main channel; and moving means are located within the connection for moving the closure member in a direction transverse to a direction of fluid flow in the main channel.

2. A valve according to claim 1, wherein said valve seat is disposed in a part of said wall of said main channel directed parallel to the direction of flow of the fuel.

3. A valve according to claim 1, wherein said moving means is a slot between said wall of said main channel and a side of said closure member facing away from said valve seat.

4. A valve according to claim 1, wherein for enabling movement of said closure member, said closure member comprises at least one flow guide vane which extends into a lateral region of said main channel and, as seen in a direction of flow, extends towards said valve seat.

5. A valve according to claim 1, wherein said closure member has the form of a sphere or roller.

6. A valve according to claim 1, further comprising at least one guide element in said main channel for said closure member.

7. A valve according to claim 6, wherein said valve seat has a bevel serving as said guide element.

8. A valve according to claim 6, wherein said guide element comprises a set of ribs extending in said main channel substantially transverse to a direction of fluid flow.

9. A valve according to claim 1, further comprising a recess to receive the closure member, said recess being located in a position substantially outside of said main channel.

10. A valve according to claim 1, further comprising magnetic elements disposed at an interface between said valve seat and said closure member for urging said closure member toward said valve seat.

11. A valve according to claim 10, wherein said magnetic elements are at said valve seat.

12. A valve according to claim 10, wherein said magnetic elements are on said closure member.

13. A valve according to claim 1, wherein said closure member has a lower specific gravity than the fuel and said valve seat is arranged above said closure member.

14. A valve according to claim 1, wherein said closure member has a higher specific gravity than the fuel and said valve seat is arranged below said closure member.

15. A flow valve for a fluid supply system, the system comprising a tank, a sucking-jet pump, and a feed device located in the fuel tank for feeding fluid via a feed line away from the tank, the valve comprising:

a main channel forming part of the feed line, a closure member, a branch line, a connection on the main channel for receiving the branch line, and a valve seat disposed in the connection;

wherein the main channel is a part of the connection, the branch line leads to the sucking-jet pump, and the closure member is disposed in the connection for controlling fluid flow in the branch line;

a passage is developed by movement of the closure member within the connection between the closure member and a wall of the connection to provide a throttle point for flowing fluid; and moving means are located within the connection for urging the closure member to move in a direction transverse to a direction of fluid flow in the main channel.

* * * * *